Dec. 24, 1963  I. W. HYND  3,115,275
ELECTRICAL CONTROL SYSTEM CIRCUIT
Filed Feb. 18, 1963
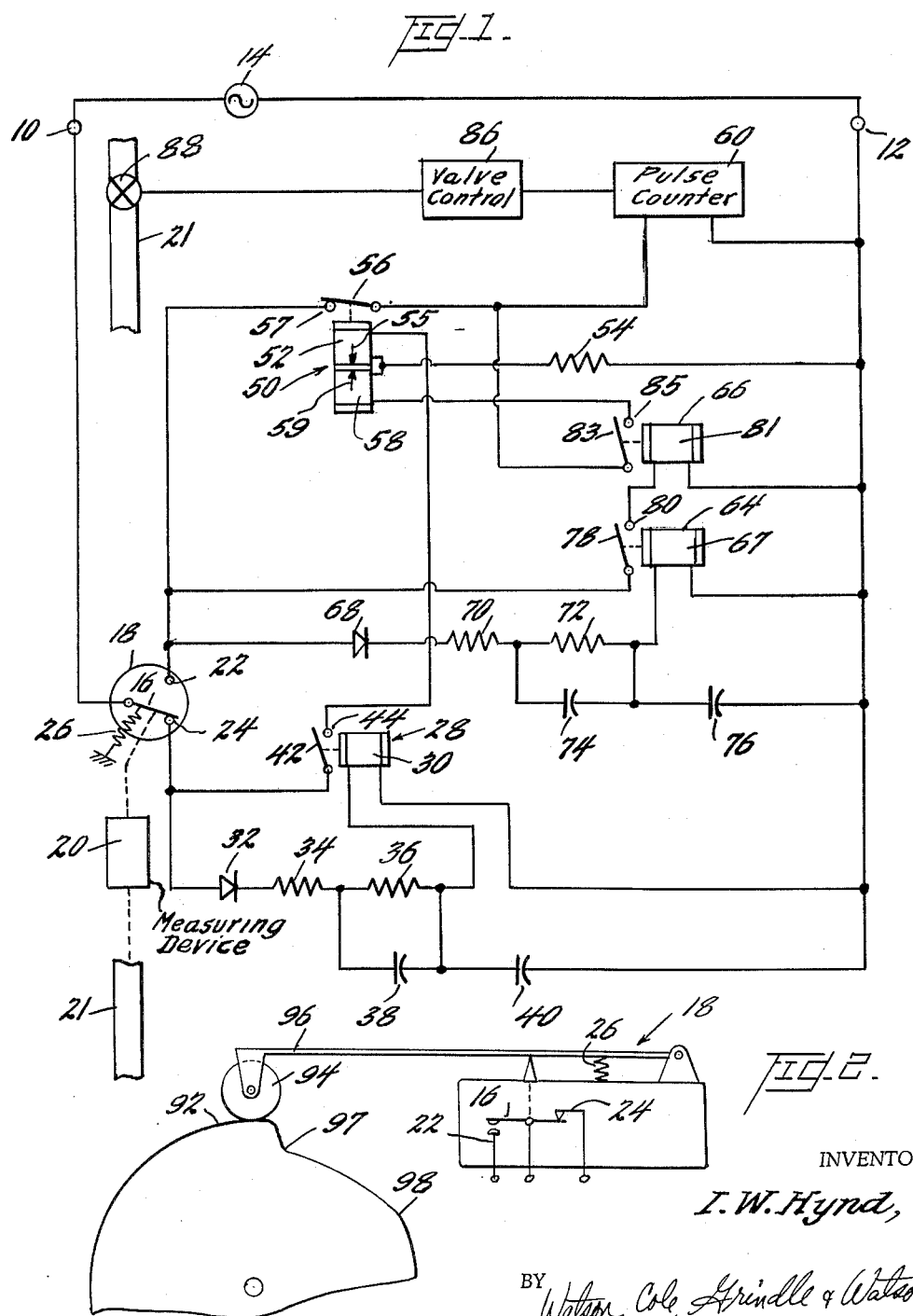
INVENTOR
*I. W. Hynd,*
BY *Watson, Cole, Grindle & Watson*
ATTORNEYS United States Patent Office 3,115,275
Patented Dec. 24, 1963

3,115,275
ELECTRICAL CONTROL SYSTEM CIRCUIT
Irvin W. Hynd, P.O. Box 93, Midland, Tex.
Filed Feb. 18, 1963, Ser. No. 259,177
13 Claims. (Cl. 222—20)

This invention relates to metering systems and more particularly, to a metering system accurately to measure and control the flow of fluids.

In dispensing oil from a storage facility into a conduit system such as a pipeline, it is necessary accurately to meter the fluid and it is often desired to terminate the flow after a predetermined volume has been dispensed. It is known in the art to employ a metering device having a pair of dials in conjunction with a fluid metering system and to set one of these dials to a value indicative of the predetermined volume to be dispensed. The other dial indicates the amount dispensed. During the time that the fluid is being dispensed, the metering device operates the one dial in reverse until this dial reaches zero. When this condition obtains, the flow is terminated through suitable means, such as a switch, connected to and actuated by the one dial.

In the prior art devices which employ electrical pulse type counters as the controlling device, certain disadvantages are present. For example, if a single pole, double throw switch is employed to deliver a pulse to the metering device or counter, it is possible to develop several pulses or counts if the power is interrupted and restored several times while the switch is in the pulse delivering position. This delivery of spurious pulses results in an excessive count and causes the premature termination of the delivery of fluid.

Accordingly, it is an object of this invention to provide a fluid metering system which obviates the above disadvantages.

It is another object of this invention to provide an improved fluid metering system utilizing an electrical pulse counting arrangement accurately to meter the flow of the fluid and including means for terminating the flow when a predetermined volume has been dispensed.

It is a further object of this invention to provide an improved electrical fluid metering system which accurately registers a single pulse at each closure of the fluid measuring device switch contacts regardless of power interruption.

These and various other objects and features of the invention will be more clearly understood from a reading of the detailed description of the invention in conjunction with the drawing in which:

FIG. 1 is a combined block and schematic diagram of one illustrative embodiment of this invention; and FIG. 2 is a combined pictorial and schematic diagram of the details of a switch and portion of the fluid measuring device of FIG. 1.

As depicted in FIG. 1, a pair of terminals 10 and 12 may be employed to connect the electrical portion of the metering system to an alternating current source represented by generator 14. Terminal 10 is connected to the armature 16 of a switch 18, the armature 16 being connected to the mechanical portion of the fluid measuring device 20. Advantageously, fluid measuring device 20 is a positive displacement meter type and moves the armature 16 into contact with contact 22 each time a predetermined volume of fluid flows through associated conduit 21. In other words, the number of times that the armature 16 engages contact 22 depends on the total volume of flow through meter 20. As will be subsequently described, the armature 16 engages contact 24 of switch 18 by suitable mechanical means, such as spring 26, when no fluid is flowing in conduit 21 and also engages contact 24 each time it disengages contact 22.

The metering system includes a relay 28 having a winding 30 serially connected between switch contact 24 and terminal 12 through a pulse clipping network including rectifier 32, resistors 34 and 36 and capacitors 38 and 40. Capacitor 38 is connected in parallel with resistor 36, while capacitor 40 is connected in parallel with the relay winding 30. The rectifier 32 rectifies the alternating current supplied from terminal 10 through armature 16 and this rectified pulsing current is smoothed by the resistor-condenser network including resistors 34 and 36 and condensers 38 and 40. The overall function of this circuit including relay winding 30 is to cause pulsing direct current to flow through the relay winding 30 when armature 16 engages contact 24. Contact 44 of relay 28 is operatively associated with armature 42. Contact 44 is connected to one terminal of winding 52 which is one of the two windings of relay 50. The other terminal of winding 52 is connected to terminal 12 by means of voltage dropping resistor 54. As indicated by arrow 55, winding 52, when energized, attracts armature 56 into engagement with contact 57. Relay 50 includes a second winding 58 which is employed to repel the armature 56 as indicated by arrow 59, to cause the armature 56 to disengage contact 57. Relay 28 and winding 52 of relay 50 cooperate to close the circuit between contact 22 of switch 18 and pulse counter 60 so that counter 60 will be energized or pulsed each time armature 16 engages contact 22 in a manner which will be subsequently described. For the purpose of this explanation, it is assumed that counter 60 is of the type which may be set to a predetermined count (representing a predetermined volume of fluid to be metered) and is stepped toward its original or zero position by each pulse applied to its input.

The metering system includes relays 64 and 66 which cooperate to energize winding 58 of relay 50 and thereby repel armature 56 to open the path between contact 22 and counter 60 each time armature 16 engages contact 22 in a manner which will be subsequently described. The circuit of winding 67 of relay 64 includes a pulse clipping network defined by rectifier 68, resistors 70 and 72, and capacitors 74 and 76. This pulse clipping network is similar to the network associated with relay 28 and acts to pass only pulses of one polarity and to smooth these pulses which are supplied from the terminals 10, 12 through contacts 16 and 22. Armature 78 of relay 64 has an associated contact 80 which is connected to the winding 81 of relay 66. Relay 66 acts as a time delay means to attract its armature 83 at a predetermined time after the winding 81 has been energized. When armature 83 is attracted it closes the circuit with contact 85, thereby energizing the repulsion winding 58 of relay 50. The return path of winding 58 is also through voltage dropping resistor 54. The pulse counter 60 is connected to and actuates a suitable valve control device 86 when a predetermined count is reached, which device in turn controls the valve 88 in conduit 21 in any well known manner. As previously mentioned, measuring device 20 is connected to conduit 21 and responds to fluid flow in the conduit and moves armature 16 into engagement with contact 22 each time a predetermined volume of fluid passes through conduit 21.

The counter actuation and de-actuation will now be described with respect to FIGS. 1 and 2. Each time a predetermined volume of fluid flows in conduit 21, the measuring device 20 rotates eccentric cam 92, which moves the armature 16 into engagement with the contact 22 by the cooperation with cam follower wheel 94 and arm 96. Because the armature 16 is coupled to wheel 94 and electrically coupled to terminal 10, current flows through the normally closed armature 56 and a pulse is recorded in pulse counter 60 each time the cam 92 makes one revolution. Each time wheel 94 moves past point 97, arm 96 moves armature 16 into engagement with contact 22. This engagement is terminated when cam 92 rotates sufficiently for wheel 94 to engage point 98. For the remainder of the cam cycle, armature 16 engages contact 24. At the same time that current flows to the energizing circuit of counter 60 through armature 16, current also flows through rectifier 68 and resistors 70 and 72 and relay winding 67. The energization of relay 64 attracts armature 78 which engages its contact 80 and thus, causes the energization of the winding 81 of the time delay 66. After a predetermined interval of time, depending upon the characteristics of relay 66, armature 83 is attracted to engage contact 85. The engagement of contacts 83 and 85 causes the energization of winding 58 of relay 50 which repels the armature 56 into an open circuit position, thus terminating the pulse of current to pulse counter 60 and thus preventing any other pulses from actuating counter 60. For example, if fluid flow were interrupted when the cam detent 97 was in engagement with wheel 94, then armature 16 would remain in engagement with contact 22. Under these assumed conditions, the energization and de-energization of generator 14 would actuate counter 60 if armature 56 was not disengaged from contact 57. Because the time delay of relay 66 is adjustable in a manner well known in the art, such as by adjusting the position of a copper sleeve on the relay coil, it is possible to adjust relay 66 to control the rapid energization of winding 58 and thus, limit the pulse length to pulse counter 60 to a single, relatively short pulse for each engagement of armature 16 with contact 22. Thus, even though the contact 16 is maintained in engaged position with contact 22 for an extended period of time during which power applied to terminals 10, 12 might be interrupted, the pulse counter will only count a single count because the pulse counter energizing circuit is open at armature 56 and contact 57.

After the armature 16 returns to its contact 24, which is during the major portion of the cycle of cam 92, current is supplied through contacts 24 and the pulse clipping network including rectifier 32, resistors 34 and 36 to winding 30 of relay 28. Energization of winding 30 attracts armature 42 to engage contact 44, which supplies current to winding 52 of relay 50, thereby attracting armature 56 into its normally closed position, i.e., in engagement with contact 57. The energizing circuit of pulse counter 60 is now completed to the contact 22 of switch 18 and the control system is in a condition to receive and count another pulse.

After a predetermined number of pulses have been counted and the pulse counter 60 is reset or driven to its initial position, counter 60 energizes the valve control device 86 by suitable means such as a pair of contacts, not shown, and the valve control device 86 actuates the valve 88 to terminate the fluid flow in conduit 21.

As will be understood by those skilled in the art, this control system assures the counting of only a single pulse by the pulse counter each time the measuring device actuates its associated armature 16 into contact with contact 22. It will also be understood that other embodiments of this invention might be employed without departing from the spirit and scope of the invention. For example, it would be possible to employ a time delay means in conjunction with the winding 58 of relay 50 rather than employing a separate relay 66.

What is claimed is:

1. In a fluid metering and control system for a fluid conduit having a flow responsive device operatively associated therewith, the combination comprising measuring means including an armature coupled to and actuated by said flow responsive device and a pair of contacts alternately engaged by said armature by the operation of said flow responsive device, electric pulse counter means for counting electric pulses and including energizing circuit means, means for coupling said energizing circuit means to one of said pair of contacts and means for decoupling said energizing circuit from one of said pair of contacts each time said armature engages said one contact.

2. The system according to claim 1, wherein said last mentioned means includes time delay means for decoupling said energizing circuit at a predetermined time after said armature engages said one contact.

3. The combination according to claim 1 including fluid control means operatively associated with said conduit and coupled to and actuated by said pulse counter means when a predetermined pulse count is reached.

4. In a system according to claim 2 including flow control means operatively associated with said conduit and coupled to said pulse counter means to be actuated thereby in response to a predetermined pulse count.

5. In an electro-mechanical fluid metering and control system for a fluid conduit the combination comprising a fluid measuring device operatively coupled to said conduit and including a first and a second electrical contact and a third contact which is coupled to said first contact each time a predetermined volume of fluid flows through said conduit and said third contact being coupled to said second contact when said third contact is disengaged from said first contact, an electric pulse counter coupled to said first contact, relay means coupled to said first contact for decoupling said electric pulse counter from said first contact when said third contact is coupled to said first contact and relay means for recoupling said first contact to said electrical pulse counter when said third contact is coupled to said second contact.

6. The system according to claim 5 including a pulse clipping network coupled to one of said relay means.

7. The system according to claim 5, wherein said relay means coupled to said first contact includes time delay means.

8. The system according to claim 5 including conduit fluid flow control means coupled to and actuated by said electrical pulse counter means.

9. The system according to claim 5, wherein each of said relay means includes a pulse clipping network coupled to one of said contacts.

10. The system according to claim 9, wherein each pulse clipping network includes rectifier means and capacitor means for rectifying and smoothing the pulses applied to certain of said relay means.

11. The combination according to claim 5, wherein said first mentioned relay means comprises a winding connected to said second contact and an armature and a second relay winding and second armature associated with said second winding, said second relay winding and said second armature cooperating to open the path between said one contact and said pulse counter.

12. The combination according to claim 11, including a winding positioned adjacent said second winding for attracting said second armature into a closed circuit condition to complete the path between the first mentioned contact and the pulse counter.

13. The combination according to claim 12, further including a pulse clipping network, a time delay relay and a relay having its winding connected to said first contact through said pulse clipping network and having its armature positioned to complete the energizing circuit of said time delay relay, said time delay relay including an armature connected to complete the energizing circuit of said second winding.

References Cited in the file of this patent

UNITED STATES PATENTS 2,834,190     Andrews et al.  ---------- May 13, 1958